(12) United States Patent
Kleinpenning (10) Patent No.: US 8,749,994 B2
(45) Date of Patent: Jun. 10, 2014

(54) SWITCHED-MODE POWER SUPPLY (71) Applicant: NXP B.V., Eindhoven (NL)

(72) Inventor: Jeroen Kleinpenning, Lent (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/043,199

(22) Filed: Oct. 1, 2013

(65) Prior Publication Data

US 2014/0098579 A1 Apr. 10, 2014

(30) Foreign Application Priority Data

Oct. 5, 2012 (EP) .................................... 12187537

(51) Int. Cl.
*H02M 3/338* (2006.01)
*H02M 3/335* (2006.01)

(52) U.S. Cl.
USPC ......................................... 363/19; 363/21.01

(58) Field of Classification Search
USPC .......................................... 363/18–21.18, 97
See application file for complete search history.

(56) References Cited

U.S. PATENT DOCUMENTS

| 3,986,097 | A | | 10/1976 | Woods | |
|---|---|---|---|---|---|
| 5,485,364 | A | * | 1/1996 | Palata et al. ..................... | 363/59 |
| 5,636,107 | A | * | 6/1997 | Lu et al. ........................... | 363/20 |
| 5,859,524 | A | | 1/1999 | Ettes | |
| 5,949,659 | A | | 9/1999 | Lesche | |
| 6,549,432 | B1 | | 4/2003 | Giannopoulos et al. | |
| 7,791,908 | B2 | * | 9/2010 | Na et al. ...................... | 363/21.02 |
| 7,835,163 | B2 | | 11/2010 | Chou | |
| 8,125,799 | B2 | | 2/2012 | Zhu et al. | |
| 8,547,711 | B2 | * | 10/2013 | Reddy ........................ | 363/21.02 |

FOREIGN PATENT DOCUMENTS

EP          0 538 624 A1      4/1993

OTHER PUBLICATIONS

Prodic, A. et al. "Digital Controller Chip Sset for Isolated DC Power Supplies", Proc. IEEE APEC Conf., vol. 2, pp. 866-872 (Feb. 2003).
Extended European Search Report for EP Patent Appln. No. 12187537.1 (Feb. 3-7, 2013).

* cited by examiner

*Primary Examiner* — Jessica Han (57) ABSTRACT

Consistent with example embodiments disclosed, there are switched-mode power supplies (SMPS) in which a signaling capacitor transmits information across a transformer of the power supply. Such embodiments can avoid drawing power from the output capacitor in order to provide communication signals and so do not cause a drop in the output voltage when signaling to the primary side. Further, the switched mode power supply can send signals from the secondary side of the transformer to the primary side via the transformer itself and so may not require the incorporation of an opto-coupler. Such embodiments may reduce production costs, the printed circuit board (PCB) footprint and reduce the no-load power consumption of the SMPS.

15 Claims, 7 Drawing Sheets

SWITCHED-MODE POWER SUPPLY

CROSS-REFERENCE TO RELATED APPLICATIONS

This application claims the priority under 35 U.S.C. §119 of European patent application no. 12187537.1, filed on Oct. 5, 2012, the contents of which are incorporated by reference herein.

The present disclosure relates to switched-mode power supplies. Specifically, although not exclusively, the disclosure relates to supplies with a signalling capacitor for transmitting information across a transformer of the power supply.

Switched-mode power supply (SMPS) converters are used in adapters and low power converters for battery chargers. Minimising the cost and size of such supplies can be very important in some applications. Today, there is a demand to reduce the no-load power consumption and improve the transient response of low cost, small sized SMPS converters.

According to a first aspect of the invention there is provided a switched-mode power supply comprising:
  a transformer with a primary winding and a secondary winding, the secondary winding having a first terminal and a second terminal;
  a rectifier with an input and an output, the input coupled to the first terminal of the secondary winding;
  an output capacitor with a first plate and a second plate, the first plate coupled to the output of the rectifier and the second plate coupled to the second terminal of the secondary winding;
  a power switch coupled in series with the primary winding, configured to be coupled between an output of a rectifier and ground;
  a signalling unit provided in parallel with the secondary winding, the signalling unit comprising a signalling capacitor and a signalling switch coupled in series with each other;
  a secondary controller configured to:
    detect a secondary side variable at the secondary winding, and
    control the signalling switch in accordance with the secondary variable, wherein closing the signalling switch is configured to generate a transformer signal by connecting the signalling capacitor to the secondary winding;
  a primary controller configured to:
    receive the transformer signal from the primary winding or a primary side auxiliary winding of the transformer, and
    control the power switch in accordance with the transformer signal.

Such embodiments can avoid drawing power from the output capacitor in order to provide communication signals and so do not cause a drop in the output voltage when signalling to the primary side.

Also, the switched-mode power supply (SMPS) can send signals from the secondary side of the transformer to the primary side via the transformer itself and so may not require the incorporation of an opto-coupler. Such embodiments may reduce productions costs, PCB footprint and no-load power consumption of the SMPS.

The signalling capacitor may be separate from the output capacitor. The rectifier may be a diode or another sort of rectifier, such as an active rectifier/synchronous rectifier.

Closing the signalling switch may be configured to generate the transformer signal by discharging the signalling capacitor into the secondary winding.

The SMPS may be configured to use secondary side sensing and so may monitor the secondary side variable constantly. In contrast, primary side sensing implementations have blind periods where the output conditions cannot be determined.

The secondary controller may be configured to control the signalling switch in accordance with the secondary variable by closing the signalling switch only once in order to generate the transformer signal. This can cause the signalling capacitor to be completely discharged into the secondary winding. Such embodiments may not require the precise timing circuitry required to ensure that only a precise quantity of energy is drawn from the output capacitor. The elimination of such circuitry represents a substantial design simplification and cost saving. As such, such embodiments may be able to operate with a no-load power below 10 mW and retain the ability to react to fast load steps. Such embodiments may be provided with an output capacitor of the order of 100 µF.

The secondary controller may be configured to control the signalling switch in accordance with the secondary variable by closing the signalling switch a plurality of times, optionally during the same ringing stroke, in order to generate the transformer signal. This can cause the signalling capacitor to be partially discharge into the secondary winding for each switch closure (pulse). Such embodiments may also include timing circuitry to ensure that sufficient signal is received at the primary side and sufficient energy is retained by the signalling capacitor after the first switch closure (pulse) for subsequent switch closures.

The secondary side variable may be indicative of one of: a voltage, a power, or a current at the secondary side of the transformer.

The primary controller may be configured to set the switching frequency of the power switch and/or the peak value of the primary stroke current or the on-time of the power switch in accordance with the transformer signal. The switching frequency of the power switch and the peak value of the primary stroke current are related to the converted power.

The secondary controller may be configured to connect the signalling capacitor to the secondary winding in one or more pulses during a ringing stroke. A ringing stroke may be a period between a secondary stroke of a first cycle and a primary stroke of a next cycle of the switched-mode power supply.

The secondary controller may be configured to discharge a single pulse or a plurality of pulses into the secondary winding during a ringing stroke.

The secondary controller may be configured to discharge one or more pulses into the secondary winding at a moment that is later in the ringing stroke, for example, after 5 or after 10 ringing cycles where the ringing has a lower amplitude by more damping over time This can be advantageous because damping reduces the amplitude of the ringing during the ringing stroke, thereby allowing a pulse with smaller energy content and so requiring less capacitor discharge to be detectable as the transformer signal at the primary side.

The transformer signal may comprise at least one of the quantities of: a rapid change of voltage across a winding of the transformer, a change of voltage below or above a threshold of a winding of the transformer and a change in ringing frequency. Each of these quantities may be considered to be a change in voltage and frequency of the transformer signal. A "rapid" change in a value may be considered as one that has a rate of change with respect to time (d/dt) greater than a threshold value.

The switched-mode power supply may further comprise a diode coupled across terminals of the signalling switch. The signalling switch may be a transistor. The transformer may be an nmos or pmos field effect transistor. The diode may be an incorporated diode of the transistor such as a back-gate diode or a body-diode.

The signalling capacitor may be configured to be charged during a primary stroke of the switched-mode power supply cycle, and optionally only the primary stroke.

The signalling capacitor may be configured to be charged during a secondary stroke of the switched-mode power supply cycle, and optionally only the secondary stroke.

The signalling switch may be a first signalling switch. The signalling capacitor may be a first signalling capacitor. The switched-mode power supply may further comprise a second signalling unit having a second signalling capacitor and a second signalling switch. A terminal of the second signalling capacitor may be coupled directly to the input of the rectifier. A terminal of the first signalling switch may be coupled directly to the input of the rectifier. The secondary controller may be further configured to control the second signalling switch in accordance with the secondary variable.

The provision of a second signalling unit allows the secondary controller to provide 2 bit communication with the primary side circuit. That is, in a single cycle, the secondary controller can provide a signal indicating that the secondary side variable is too low or too high (or alternatively, that it is increasing or decreasing). The secondary controller may provide no signal at all if the secondary side variable is within a desired range.

A first polarity transformer signal resulting from a discharge of the first signalling capacitor may be of an opposite polarity to a second polarity transformer signal resulting from a discharge of the second signalling capacitor. The primary controller may be configured to increase the power delivered to the primary winding if the first polarity transformer signal is received. The primary controller may be configured to decrease the power delivered to the primary winding if the second polarity transformer signal is received.

The primary controller may be configured to alter the power level within a cycle of the power supply by a step with a step size. The step size may be one of: a constant step size; a step size that scales with the absolute power level for a constant ripple voltage; and a step size determined by an algorithm that enlarges the step size if consecutive power-up or power-down transformer signals are received.

The secondary controller may be configured to part-discharge the signalling capacitor by providing a pulsed signalling switch control signal in order to provide a plurality of transformer signals. The plurality of transformer signals may be different transformer signals. The signalling switch control signal can have a defined number of pulses, a defined on-time and a defined frequency and/or can have a defined peak discharge current and a defined frequency.

The secondary controller is configured to part-discharge the first signalling capacitor and to part-discharge second signalling capacitor by providing respective pulsed signalling switch control signals in order to provide a plurality of transformer signals.

The signalling capacitor may have a first plate coupled to the first terminal of the secondary winding. The signalling capacitor may have a second plate coupled to the signalling switch. The switched mode power supply may further comprise a charging switch. The charging switch may have a first terminal coupled to the first plate of the output capacitor. The charging switch may have a second terminal coupled to the second plate of the signalling capacitor. The secondary controller may be configured to operate the charging switch in accordance with the secondary variable.

There may be provided a battery charger comprising any switched-mode power supply disclosed herein.

There may be provided a computer program, which when run on a computer, causes the computer to configure any apparatus, including a switched mode power supply, circuit, controller, converter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

The invention will now be further described by way of example only with reference to the accompanying drawings in which:

FIG. 4 illustrates a circuit diagram for a secondary controller package suitable for use with the switched mode power supply of FIG. 3a;

It can be necessary to sense the output variable to be regulated in a switched mode power supply (SMPS) in order to ensure that the supply delivers the required output voltage at variable load conditions. Some embodiments of the invention relate to a switched mode power supply that uses secondary side sensing and provides feedback information to the primary side via a transformer.

Figure 1A:
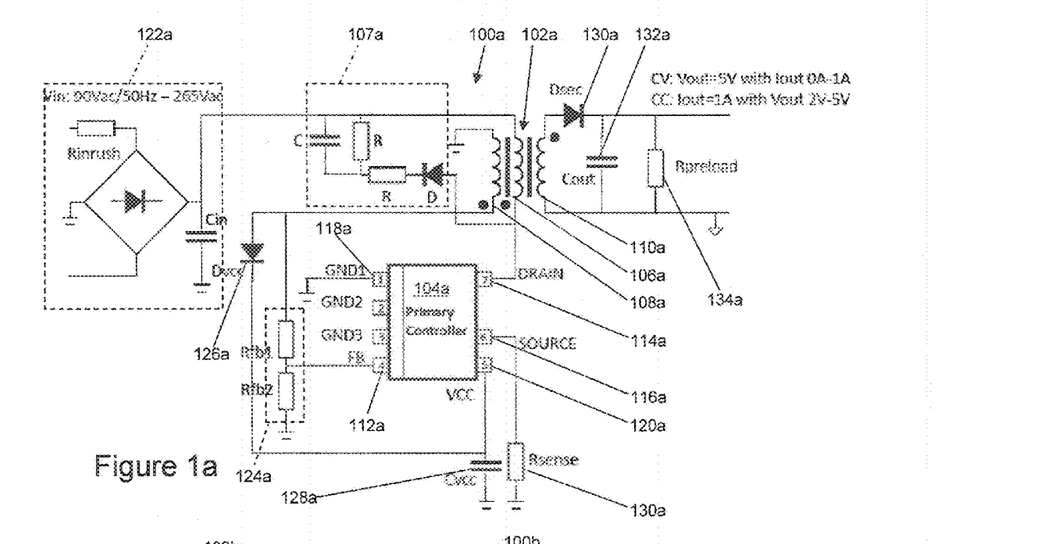
FIG. 1a illustrates a circuit diagram for a switched mode power supply that uses primary side sensing.
Figure 1B:
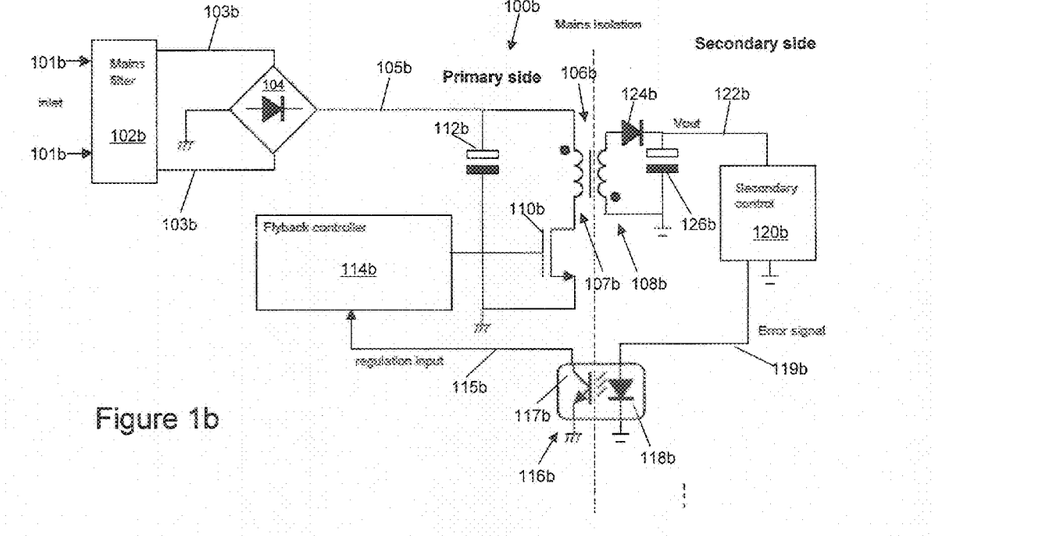
FIG. 1b illustrates a circuit diagram for a switched mode power supply that uses secondary side sensing and transmits signals from the secondary side to the primary side using an opto-coupler.

FIG. 1 illustrates two examples of SMPS circuits. In the example of FIG. 1a, a power supply converter is controller by monitoring signals obtained at the primary side (the mains power side) of the transformer. FIG. 1b illustrates another example in which the power supply is controlled by monitoring signals obtained at the secondary side of the transformer (the isolated voltage side).

The switched mode power supply 100a of FIG. 1a comprises a transformer 102a and a primary controller 104a.

The primary controller 104a has a feedback input 112a, a drain 114a and a source 116a, as well as a ground connection 118a on the primary side, and a power supply connection 120a.

The transformer has a primary winding 106a, an auxiliary winding 108a and a secondary winding 110a. Each of the windings 106a, 108a, 110a has a first terminal and a second terminal.

The first terminal of the primary winding 106a is coupled to a rectified power supply 122a and the second terminal of the primary winding 106a is coupled to the drain 114a of the primary controller 104a. The second terminal of the primary winding 106a is also coupled to a clamp 107a which can be used to dampen parasitic oscillations in the transformer and limit the peak voltage on the drain 114a of the power switch within the primary controller 104a. It will be appreciated that many arrangements of the clamp 107 may be provided depending on the performance required as is known to the person skilled in the art.

The first terminal of the auxiliary winding 108a is coupled to ground and the second terminal of the auxiliary winding 108a is coupled to the feedback input 112a of the primary controller 104a via a potential divider 124a. The second terminal of the auxiliary winding 108a is also coupled to the supply voltage connection 120a of the primary controller 104a by a rectifier diode 126a, which supplies power from the auxiliary winding 108a. The supply voltage connection 120a of the primary controller 104a is also buffered by a buffer capacitor 128a. The primary controller 104a may tolerate some variance in the supply that is drawn from the auxiliary winding 108a.

The source 116a of the primary controller 104a is coupled to ground by a sensing resistor 130a.

The primary controller 104a operates a transistor switch, also referred to as a power switch, which couples the source 116a to the drain 114a in accordance with a voltage detected at the potential divider 124a, which in turn depends on a signal induced in the auxiliary winding 108a. The primary controller 104a is configured to set the switching frequency of the power switch and/or the magnitude of a primary stroke current in accordance with the voltage detected at the feedback input 112a. The switching frequency of the power switch and the magnitude of the primary stroke current are related to the power delivered to the primary winding. If the detected voltage at the feedback input 112a is lower than required, the primary controller 104 increases the power delivered to the primary winding 108a. Likewise, if the detected voltage is higher than required, the primary controller 104 decreases the power delivered to the primary winding 108a.

On the secondary side of the transformer 102a, the secondary winding 110a is coupled in series with a rectifier, which in this example is a diode 130a. In this example the anode of the diode 130a is directly connected to the secondary winding 110a. An output capacitor 132a and a preload resistor 134a are provided in parallel with the series arrangement of the secondary winding 110a and the diode 130a.

The output capacitor 132a stores charge to smooth the output voltage. The value of output capacitor 132a is selected to have a suitably large capacitance to provide a ripple voltage that falls below the maximum allowed for the system.

Primary side sensing can satisfy the requirement of low cost. However, it may be difficult to simultaneously provide the required transient response using a primary sensing SMPS. In order to provide a good transient response on a load step from a no-load condition to a 0.5 A (USB current level) load condition, the power supply should provide an output voltage that does not drop too much. However, a controller that uses primary sensing may not be able to determine the output voltage when the power switch is not switching. In a power supply converter operating in no-load conditions and conforming to the requirement that the power consumption is below 10 mW, the power switch has to operate at a minimum frequency, typically below 500 Hz. In this case, the primary controller 104a is 'blind' (does not receive information) for periods of 2 ms time or more. Because of the blind period, a 0.5 A load step introduced by connecting a device, such as a mobile telephone with an empty battery, to the power supply converter during a non-switching period causes the output voltage to drop until the primary controller in no-load state makes the next cycle. If the output voltage drops below a loss of charger level (the USB standard specifies a voltage of 4.1V), then the telephone stops requesting load current. The output voltage of the supply then recovers to 5V as no load is present on the output of the supply. The telephone then detects the 5V supply and attempts to draw load. Such a cycle repeats without charging the battery and therefore can be unacceptable.

In order to provide the required performance, the output capacitor 134a needs to be large: typically larger than 1 mF. A large output capacitor can be too big to satisfy small size requirement for a power supply applications. In some applications, a power density better than 5 W/inch$^3$ is desirable. Increasing the minimum switching frequency of the power supply 100a enables a smaller output capacitor to be used, but has the detrimental consequence that the no-load power consumption is increased. Therefore, a compromise exists between providing low no-load power consumption and good transient response, especially for small, low cost primary sensed converters.

An alternative approach to primary side sensing is to regulate a SMPS using secondary side sensing. This regulation can be performed by sensing the output variable, comparing it with a reference value at the secondary side of the transformer to determine a difference/error signal and sending the error signal from the secondary side to the primary side by an opto-coupler. An example of such a converter 100b is given in FIG. 1b.

In FIG. 1 an AC power supply signal 101b is provided to a mains filter 102b, which filters out high frequency noise produced by the switching actions inside the converter from reaching the power supply signal 101b. The converter power signal 103b is provided to a bridge rectifier 104b which in this example provides full wave rectification of the converter power signal 103b. A rectified signal 105b is provided by the bridge rectifier 104b to a first terminal of a primary winding 107b of a transformer 106b. A second terminal of the primary winding 107b of the transformer 106b is coupled to ground via the conduction channel of a switch. In this example, the switch is provided as a field effect transistor 110b with the conduction channel being the source-drain path of the transistor 110b. The transistor switch 110b may be referred to as a power switch. The first terminal of the primary winding 107b is also coupled to ground by a capacitor 112b. The effect of this capacitor 112b is to smooth the rectified signal 105b supplied by the AC power supply.

The gate of the power switch 110b is controlled by a flyback controller 114b, which varies the gate potential in accordance with a regulation input signal 115b received from the opto-coupler 116b. It will be appreciated that the opto-coupler 116 may be used to maintain the electrical isolation between the primary side and the secondary side of the transformer 106b.

The opto-coupler 116b has a primary side sensor 117b which provides the regulation input signal 115b to the controller 114b. The opto-coupler 116b also has a secondary side emitter 118 that receives an error signal 119b. The error signal 119b is determined by a secondary side controller 120b, which receives an output signal 122b of the flyback converter from the secondary winding 107b. The error signal 119 may be a signal that provides information necessary to control the primary winding 107 or purely be indicative of the divergence in the output signal 122 from the desired value.

A first terminal of the secondary winding 108b is coupled to a terminal of an output diode 124b that is configured to allow conventional current to flow away from the first terminal of the secondary winding 108b. The second terminal of the output diode 124b is coupled to a first plate of an output capacitor 126b (this output capacitor can also be referred to as an elcap). The second plate of the output capacitor 126b is coupled to both a second terminal of the secondary winding 108b and the ground. The output signal 122b is provided at the junction between the output diode 124b and the output capacitor 126b.

In some applications, the opto-coupler 116b and secondary side controller arrangement 120b can be too expensive in terms of consumed power, as well as cost and number of components. This may be particularly true in the low power adapter and LED driver markets. Therefore, it may be desirable to provide a switching circuit that does not require an opto-coupler.

Figure 2:
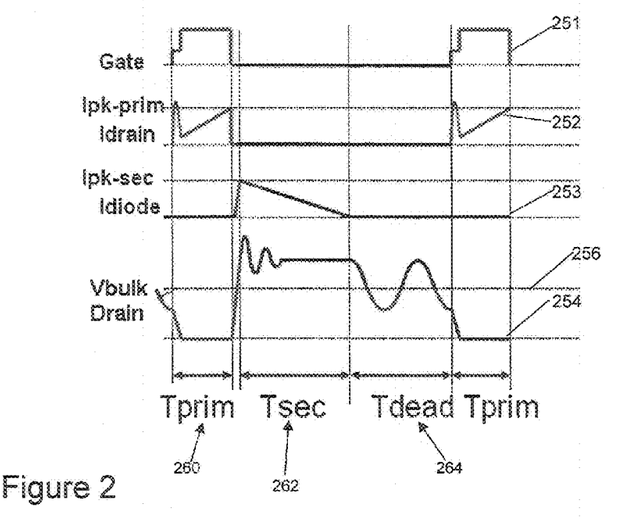
FIG. 2 illustrates signals found in a switched mode power supply.

FIG. 2 illustrates profiles of several signals within a flyback converter in discontinuous conduction mode (DCM). In DCM or boundary conduction mode (BCM), the current in the secondary circuit is high at the start of the secondary stroke and gradually reduces to zero at the end of the secondary stroke 262.

Providing a secondary sensed power supply alleviates some of the problems related to providing a smaller output capacitor 126a and eliminates or reduces 'blind' periods. However, changing from a primary sensed to secondary sensed implementation using an opto-coupler to provide feedback to the primary side can be undesirable due to the cost of implementing the opto-coupler communication and also the increase in no-load power consumption due to the opto-coupler.

In order to further explain the operation of a switched mode power supply, a complete switching cycle is shown in FIG. 2, and consists of three periods; a primary stroke 260 followed by a secondary stroke 262 and a ringing time 264, which may also be referred to as a ringing period, dead stroke or dead period. The ringing time 264 starts at the end of a secondary stroke 262 and ends at the start of the next primary stroke 260.

The primary stroke 260 (which may also be referred to as a magnetization period, or 'on' period) of the switching circuit can be considered as the period of time between the instant that the power switch is closed and the instant of maximum magnetization current in the transformer. Alternatively, the primary stroke 260 may be considered as the period of time between the instant that the power switch is closed and the time at which the power switch is opened (turned off). The schematic of FIG. 2 shows an interval between the end of the primary stroke 260 and the start of the secondary stroke 262. This interval can be ignored in many practical applications as it is relatively short. Alternatively, in some examples the interval may be considered to be part of the primary stroke 260.

A secondary stroke 262 (which may also be referred to as a demagnetization period, or 'off' period) can be considered as the period of time that magnetic energy is flowing to the output of the flyback converter up until the magnetization current in the transformer falls to zero.

The top signal 251 in FIG. 2 is the voltage at the gate of a switching transistor (power switch). This gate signal 251 is high during the primary stroke (by definition). The gate signal 251 is low during all other periods of the switching cycle. When the gate signal 251 transitions from low to high, current starts flowing through the primary winding and the conduction channel of the switching transistor.

The primary current 252 is shown in the second graph of FIG. 2. After an initial surge in the primary current 252 due to discharging of the drain node of the primary switch, the primary current 252 ramps up linearly from a low level until it reaches a peak value, which is identified in FIG. 2 as Ipk-prim.

The third graph of FIG. 2 shows a curve 253 plotting the current through the output diode on the secondary winding side. It can be seen that this current 253 is zero during the primary stroke 260. At the end of the primary stroke 260, the energy stored in a magnetic field by the primary winding 206 starts to be transferred to the secondary winding. As the output current 253 rises from zero to a peak value, referred to as Ipk-sec, in the gap between the end of the primary stroke and the start of the secondary stroke. The current delivered to the secondary winding (as measured through the output diode) decays from the peak value Ipk-sec to zero over the course of the secondary stroke 262.

The fourth graph of FIG. 2 shows the voltage at the drain of a switching transistor that is connected in series with the primary winding. This voltage will be referred to as Vdrain 254. When the gate signal 251 is high in the primary stroke 260, Vdrain 254 is close to zero.

When the gate signal 251 goes low, Vdrain 254 starts to rise. When Vdrain 254 crosses the converter input voltage (which is identified in FIG. 2 with reference 256), the secondary stroke 262 starts. The period of time during which Vdrain 254 rises from zero to the input voltage level represents the gap between the primary and secondary strokes 260, 262.

Vdrain 254 continues to rise at the beginning of the secondary stroke 262. Vdrain 254 reaches a peak value and then starts to oscillate with oscillations that gradually decrease in amplitude. The oscillations eventually decay to have negligible amplitude, and Vdrain 254 then has a relatively constant value up until the end of the secondary stroke 262.

Immediately upon expiry of the secondary stroke 262, and up until the next primary stroke 260, a ringing time 264 occurs during which Vdrain 254 oscillates. For a flyback converter, the output current is given by the formula:

$$Iout = \frac{Ipk}{2} * N * \frac{T\sec}{Tprim + T\sec + Tring}$$

where:
- N is the turns ratio of the transformer,
- Iout is the output current,
- Ipk is the peak current in the primary winding,
- Tprim is the duration of the primary stroke, also referred to as the magnetization period,
- Tsec is the duration of the secondary stroke, also referred to as the demagnetization period, and
- Tring is the duration of the ringing period (the period between the end of the secondary stroke and the start of the next primary stroke).

The total period of the switching cycle (Tprim+Tsec+Tring) is equivalent to the chosen switching period, Ts. Where the chosen switching frequency, $$Fs = \frac{1}{Ts}.$$

The output power, Pout, of an ideal flyback converter (without losses) operating in discontinuous conduction mode is:

$$Pout = \frac{(Ipk)^2}{2} * Lp * Fsw$$

where:
- Lp is the inductance of the primary winding,
- Ipk is the peak current in the primary winding,
- Fsw is the switching frequency of the power switch.

FIGS. 3a, 3b 3c and 3d illustrate four circuits in accordance with embodiments of the invention.

Figure 3A:
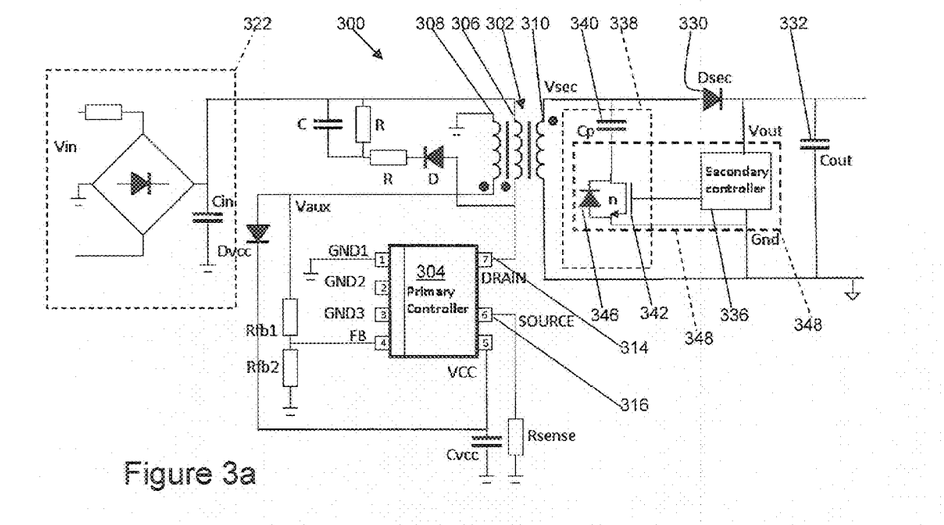
FIG. 3a illustrates a circuit diagram for a switched mode power supply that uses primary side sensing and has an additional secondary controller that transmits a 1-bit signal from the secondary side to the primary side by discharging a capacitor into the transformer when the output voltage drops below a reference level.

FIG. 3a illustrates a switched mode power supply (SMPS) 300 comprising a transformer 302, a primary controller 304, a secondary controller 336, a rectifier 330, an output capacitor 332 and a signalling unit 338.

The transformer 302 has a primary winding 306, an auxiliary winding 308 at the primary side, and a secondary winding 310. The secondary winding 310 has a first terminal and a second terminal.

The rectifier 330 has an input and an output. The rectifier 330 may be a diode or another sort of rectifier, such as an active rectifier. The input of the rectifier 330 is coupled to the first terminal of the secondary winding 310.

The output capacitor 332 has a first plate and a second plate. The first plate of the output capacitor 332 is coupled to the output of the rectifier. The second plate of the output capacitor 332 is coupled to the second terminal of the secondary winding 310. The second terminal of the secondary winding 310 is coupled to ground.

Many of the features of the switched mode power supply are similar to those illustrated in relation to the power supply of FIG. 1a and will not be discussed in detail here. In general, corresponding features are labelled using corresponding reference numerals in FIGS. 1a and 3.

The signalling unit 338 is provided in parallel with the secondary winding 310 of the transformer 302, which is also in parallel with the output capacitor 332 and rectifier 330. The signalling unit 338 comprises a signalling capacitor 340 and a signalling switch 342 coupled in series with each other. The signalling switch 342 can be a transistor such as a nmos transistor. The signalling capacitor 340 is separate from the output capacitor 332. In this example, a signalling diode 346 is also provided across the signalling switch 342.

In the example shown, where the anode of the signalling diode 346 is directly connected to the capacitor, the signalling capacitor 340 is charged during a primary stroke of the cycle of the SMPS as the signalling diode 346 is forward biased and short circuits the signalling switch 342. The signalling capacitor 340 is not discharged during other strokes unless the signalling switch 342 is closed as the signalling diode 346 is reverse biased and the signalling switch 342 is open. If the polarity of the signalling diode 346 were reversed, the signalling capacitor 340 would be charged during a secondary stroke of the cycle of the power supply and not discharged during other strokes. Alternatively, the signalling switch 342 could be operated using a synchronous (active) rectification technique, in which case the signalling diode 346 may not be required at all.

The secondary controller 336 is configured to detect a secondary side variable at the secondary winding 310 and control the signalling switch 342 in accordance with the secondary variable. Operation of the signalling switch 342 may be controlled by a signalling switch control signal that is generated by the secondary controller 336. The secondary side variable may be indicative of one or more of: a voltage, a power, or a current at the secondary winding 310. For example, the secondary controller 336 may monitor the output voltage using a comparator and close the signalling switch 342 if the output voltage drops below a predefined level. In effect, the secondary controller 336 is configured to transmit an output change trigger (transformer signal) to the primary controller 304 via the transformer 302.

Closing the signalling switch 342 generates a transformer signal by discharging the signalling capacitor 340 into the secondary winding 310. Typically, the secondary controller 336 will operate the signalling switch 342 during a ringing time of the cycle in order to modify the ringing waveform on the secondary winding 310. The effect of the transformer signal on the ringing time waveform is discussed below in relation to the profiles in FIGS. 5 to 8. In order to provide the transformer signal during the required part of the power cycle, the secondary controller 336 can comprise a timer that only allows the signalling switch 342 to be operated during the desired strokes. The provision of such a timer is discussed with reference to FIG. 4.

The signalling capacitor 340 acts as an energy reservoir that is reserved for providing the transformer signal, which in this example can be considered to be a "1-bit" communication; the signal is either provided or not. The secondary side of the SMPS is able to provide the transformer signal without drawing load from the output capacitor 332 at the instant it is sent. By not needing to draw load from the output capacitor 332 in order to provide the transformer signal, the SMPS 300 does not cause a drop in output voltage when signalling. The SMPS 300 also does not require any precise timing circuitry that may be required if a small pulse of energy were to be extracted from the output capacitor 332 in order to provide a transformer signal. The elimination of such circuitry represents a substantial design simplification and cost saving. A minimum value of the signalling capacitor 340 may be the value of the parasitic capacitance on the switching node transferred to the secondary side. For a 5 W power supply converter, a low value for the signalling capacitor 340 of about 10 nF may be suitable, as a non-limiting example.

The secondary controller 336, signalling switch 342 and signalling diode 346 (if any) can be provided on as a single 3-pin integrated package 348. An internal layout of such a package is discussed below with reference to FIG. 4.

The primary controller 304 is configured to receive the transformer signal from the primary side auxiliary winding 308 of the transformer 302, although in other examples the primary controller 304 could be configured to receive a transformer signal from the primary winding 306 of the transformer 302. It will be appreciated that discharging the signalling capacitor 340 in to the secondary winding 310 affects the voltage across the primary winding 306 and the primary side auxiliary winding 308, which can be interpreted as a transformer signal.

In this example a power switch is provided within the primary controller 304, although it will be appreciated that these components couple be considered to be separate functional units in other examples. The source 314 and drain 316 of the primary controller 304 relate to a conduction channel of the power switch. The power switch and primary winding 306 are in series with each other, and together are configured to be coupled between an output of a rectifier 322 of the power supply and ground.

It should be noted that the internal configuration of the primary controller 300 is not the same as that in FIG. 1 as it can perform additional functionality. The connections to the primary controller 304 illustrated in FIG. 3 are also merely an example of a number of possible configurations of the primary controller 304.

The primary controller 304 can be configured to detect a transient (transformer signal) in a time slot between the end of the secondary stroke and the start of the next primary stroke: the ringing time, or ringing period. This transient may include a positive dV/dt, a negative dV/dt, a temporarily low Vfb (primary side coil voltage provided to the feedback terminal of the primary controller 304), a temporarily high Vfb, or a lower ringing frequency. That is, the transformer signal comprises at least one of: a rapid change of voltage across a winding of the transformer, a change of voltage below or above a threshold of a winding of the transformer and a change in ringing frequency. A temporarily high or low value may be one that is sufficiently high or low for a period of time that is larger.

dV/dt detection can be used at any moment in the ringing time. Low Vfb or high Vfb detection can be particularly useful if ringing is damped, such as in low power modes with a low switching frequency. Monitoring the frequency may require more control circuitry and may need a larger ringing period, which in some applications can degrade efficiency.

Examples of the signals that may be detected by the primary controller 304 are provided in FIGS. 5 to 8.

The primary controller 304 may compare the received signals with a value that would be expected at that period of the ringing time in order to determine if a transformer signal has been received. The primary controller is configured to control the power switch in accordance with the transformer signal. For example, if a transformer signal is received, the primary controller 304 can change operation from a low power mode to a high power mode.

Figure 3B:
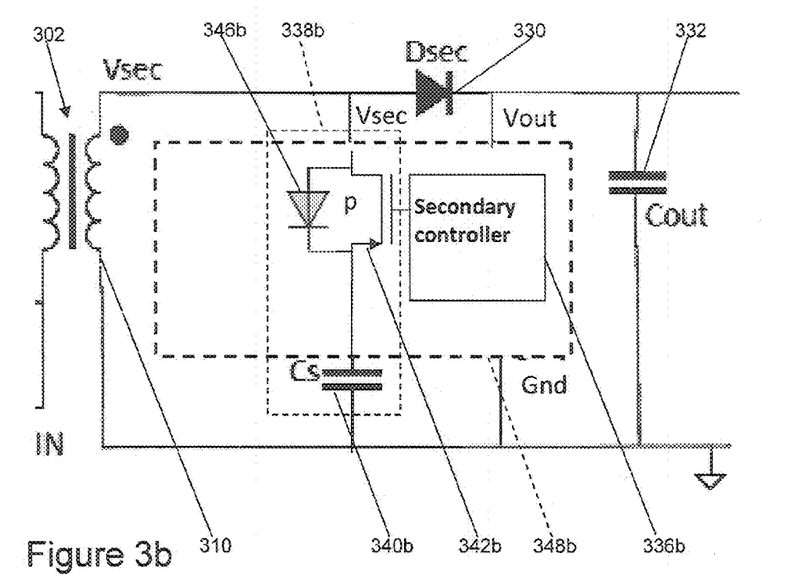
FIG. 3b illustrates an alternative arrangement for the secondary side of the switched mode power supply of FIG. 3a where the polarity of the capacitor is reversed.
Figure 3C:
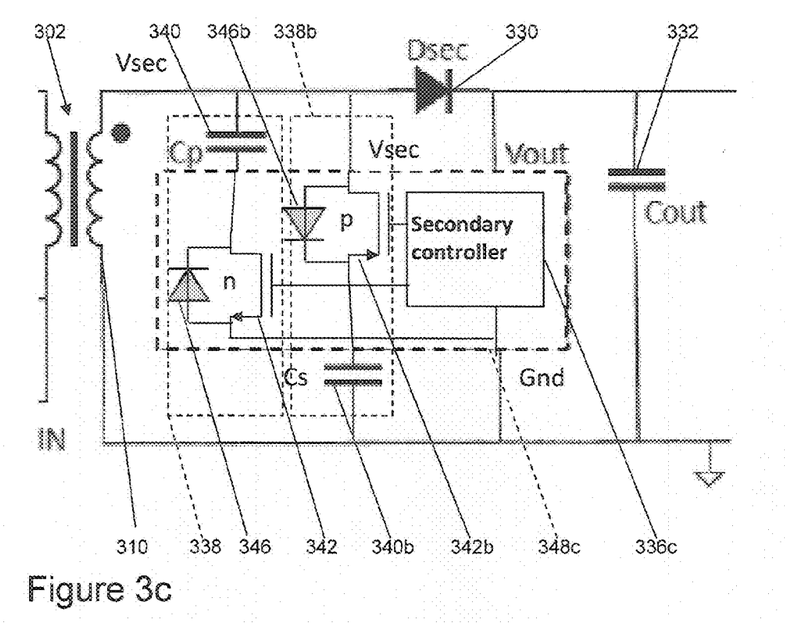
FIG. 3c illustrates an arrangement for the secondary side of the switched mode power supply of FIG. 3a where a second capacitor with a reversed polarity is provided for transmitting a 2-bit signal by discharging two capacitors for power-up and power-down control.
Figure 3D:
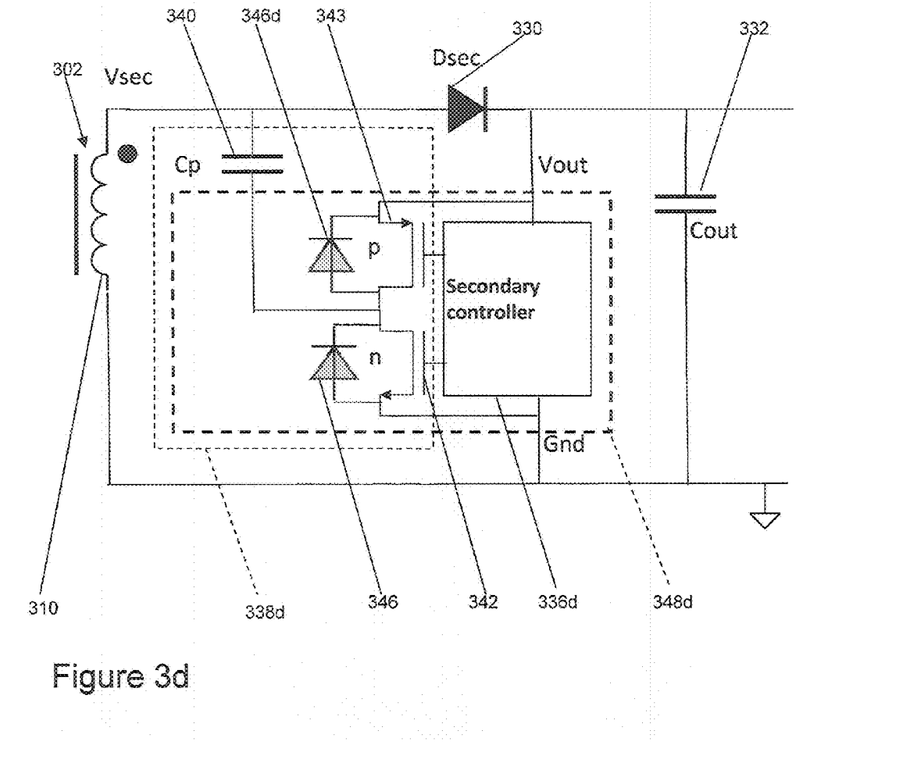
FIG. 3d illustrates an arrangement for the secondary side of the switched mode power supply of FIG. 3a where the capacitor can be charged from an output capacitor.

FIGS. 3b, 3c and 3d illustrate alternative arrangements for the secondary side of the SMPS 300 of FIG. 3a. The secondary winding 310, rectifier 330, output capacitor 332 and ground in FIGS. 3b, 3c and 3d are the same as described above in relation to FIG. 3a.

In FIG. 3b, a signalling unit 338b comprises a series arrangement of a signalling capacitor 340b and signalling switch 342b. This series arrangement is coupled in parallel with the secondary winding 310 of the transformer 302. The signalling switch 342b may be implemented as a pmos transistor. A first terminal of the signalling switch 342b is directly coupled to both an input of the output diode 330 and the first terminal of the secondary winding 310. A second terminal of the signalling switch 342b is coupled to a first plate of the signalling capacitor 340b. A second plate of the signalling capacitor 340b is directly coupled to second terminal of the secondary winding 310.

A signalling diode 346b is also provided across the signalling switch 342b, although it will be appreciated that this may not be required in examples where the signalling switch 342b is operated as an active rectifier.

The signalling capacitor 340b is charged during a secondary stroke of the switched-mode power supply cycle as the signalling diode 346b is forward biased and the signalling switch 342b is open in this phase of operation. It will be appreciated that the polarity of a pulse (transformer signal) supplied to the secondary winding 310 by the signalling capacitor 340b in FIG. 3b is the opposite of that produced by the signalling capacitor in FIG. 3a.

The secondary controller 336b in FIG. 3b may also be similar to that of FIG. 3a. However, the secondary controller 336b turns the pmos transistor 342b that provides the signalling switch) to an on-state (closed) by pulling down the gate to 0V once the output voltage drops below a defined level. Alternatively, the secondary controller 336 may be configured to provide the transformer signal in response to a change in output current or power of the SMPS 300. A disadvantage of the arrangement shown in FIG. 3b compared to that of FIG. 3a is that the secondary controller package 348b requires an additional pin, Vsec, which is connected to the first terminal of the secondary winding.

FIG. 3c illustrates another arrangement for the secondary side of the switched mode power supply 300. In this arrangement, a first signalling unit 338 and a second signalling unit 338b are provided. The first signalling unit 338 is similar to that in FIG. 3a. The second signalling unit 338b is similar to that in FIG. 3b. The secondary controller 336c is configured to provide trigger signals to the first signalling unit 338 and the second signalling unit 338b. As the two signalling units each provide transformer signal with opposite polarity, they can be used to represent more than a single bit of information. This can be used to indicate different events or actions to be taken by the primary controller. The provision of two different signals can be referred to as a "2 bit" technique.

The secondary controller 336c can react to a falling or rising output voltage (or current or power) by, for example, providing a transformer signal to the primary side controller using the first signalling unit 338 if the output voltage is too high, or is increasing. Also, the second signalling unit 338b can be used to provide a different transformer signal if the output voltage is too low, or decreasing. No transformer signal may be required if the output voltage is within an acceptable threshold.

The secondary controller 336c can be configured to provide a first polarity transformer signal resulting from a discharge of the first signalling capacitor 340 and/or to provide a second polarity transformer signal that results from a discharge of the second signalling capacitor 340b. The first polarity transformer signal is of an opposite polarity to the second polarity transformer signal and therefore the two transformer signals can be distinguishable from each other. The secondary controller 336c is configured to provide one or both transformer signals in accordance with a detected secondary side variable.

Discharging the signalling capacitor 340 of the first signalling unit 338 results in a transformer signal comprising a steep negative voltage (dV/dt) being received at the feedback terminal of the primary controller. Discharging the signalling capacitor 340b of the second signalling unit 338b results in a transformer signal comprising a steep positive voltage (dV/dt) being received at the feedback terminal of the primary controller. The primary controller therefore receives the transformer signal and is configured to increase or decrease the power delivered to the primary winding depending upon the transformer signal received. That is, the primary controller is configured to increase the power delivered to the primary winding when the first polarity of transformer signal is received and to decrease the power delivered to the primary winding when the second polarity of transformer signal is received. It will be appreciated that in other implementations, the polarity of the transformer signals could be reversed.

Such 2 bit communication gives four possibilities. For example: 00=no power change, 01=power-up, 10=power-down, 11=additional possibility. The additional possibility could be representative of a large or small power change/step size. The 2 bit communication can allow two transformer signals with opposite polarity to be sent in the same ringing period, (but not at the same moment). This information can be used for an additional communication function: for example a protection function that triggers a stop of switching and puts the primary controller in a protection state.

On receiving a transformer signal of the "2 bit" communication, the primary controller in some examples can determine a magnitude of the change in power that is required. Examples of a step size in power change that may be used are a constant step size, a step size that scales with the absolute power level for a constant ripple voltage, and a step size determined by an algorithm that enlarges the step size if consecutive power-up or power-down bits (transformer signals of different polarities) are received. The switched mode power supply may operate using hysteretic control on a cycle-by-cycle basis.

FIG. 3d illustrates an arrangement for the secondary side of the switched mode power supply of FIG. 3a where the capacitor can be charged from an output capacitor. In this arrangement, a signalling unit 338d is provided that is similar to that in FIG. 3a to the extent that it comprises a signalling capacitor 340 and a signalling switch 342 provided in series with the secondary winding 310. The signalling capacitor has a first plate coupled to the first terminal of the secondary winding 310 and a second plate coupled to the signalling switch 342.

As in FIG. 3a, a signalling diode 346 is provided across the signalling switch 342, although it will be appreciated that this may not be required in examples where the signalling switch 342 is operated as an active rectifier. A cathode of the signalling diode 346 is coupled to the second plate of the signalling capacitor 340.

The signalling unit 338d further comprises a charging switch 343. A conduction channel of the charging switch couples the second terminal of the signalling capacitor 340 to a Vout plate of the output capacitor 332.

A charging diode 346d is also provided across the charging switch 343, although it will be appreciated that this may not be required in examples where the signalling switch 342 is operated as an active rectifier. An anode of the charging diode 346d is coupled to the second plate of the signalling capacitor 340.

In this example, the charging switch 343 is provided by a pmos transistor and the signalling capacitor 342 is provided by a nmos transistor.

The secondary controller 336d is configured to control the signalling switch (342) and the charging switch 343 in accordance with the secondary variable. The provision of the charging switch 343 allows the secondary controller to provide 2-bit and multi-bit communication with the primary side circuit.

The secondary controller 336d may be configured to operate the signalling and charging switches 342, 342d in a number of ways. The secondary controller 336d may provide transformer signals during the ringing period. For example, the secondary controller 336d can provide a first polarity transformer signal by charging the signalling capacitor 340 by closing the charging switch 343 while the signalling switch 342 is open, thereby charging the signalling capacitor 340 using a potential between the output capacitor 332 and the first terminal of the secondary winding 310. The charging switch 343 may then be opened, isolating the signalling capacitor 340. An opposite, second polarity transformer signal may be provided by discharging the signalling capacitor 340 into the secondary winding 310 by closing the signalling switch 342.

A capacitance of the signalling capacitor 340 may be less than a capacitance of the output capacitor 332. In such examples, only a subset of the charge on the output capacitor 332 can be provided to the signalling capacitor 340 by closing the charging switch 343, irrespective of the duration of the closure of the charging switch 343. As such, the example shown in FIG. 3d provides for a small amount of the charge on the output capacitor 332 to be used to provide a transformer relay signal without the necessity of providing precise timing circuits in the secondary controller 336d. As such, a simpler or more efficient switch mode power supply may be provided.

Communication using the signalling capacitor 340 in this arrangement can be repeated in the same ringing period to provide a multi-bit or multi symbol communication. A plurality of symbols may together represent the secondary variable or the controllable variable. The plurality of symbols together, rather than individually, may convey a discrete piece of information related to the secondary variable. The piece of information can be indicative of the secondary variable or indicative of a value that the controllable variable should take. The plurality of symbols can be considered to be a permutation or combination of separate symbols. The steps for providing first and second polarity transformer signals can be repeated in order to provide a multi-symbol communication, that is, a plurality of transformer relay signals, optionally within the same ringing period.

The secondary controller package 348d in this example only requires three pins, as with the embodiment shown in FIG. 3a.

In another example (not shown in FIG. 3), the switched-mode power supply comprises a plurality of signalling units. Each signalling unit has a signalling capacitor. A first plate of each of the plurality of signalling capacitors is coupled to a terminal of the secondary winding. Each of the plurality of signalling capacitors have a different capacitance. The secondary controller is configured to connect a different one of the plurality of capacitors in order to provide a transformer signal of a different frequency, according to the secondary variable. In such an example, the primary controller is configured to determine the frequency of the transformer signal and control the power switch in accordance with the transformer signal. In this way, more sophisticated information can be encoded into the transformer signal. For example, the magnitude of an error signal could be passed from the secondary side to the primary side of the transformer.

Figure 4:
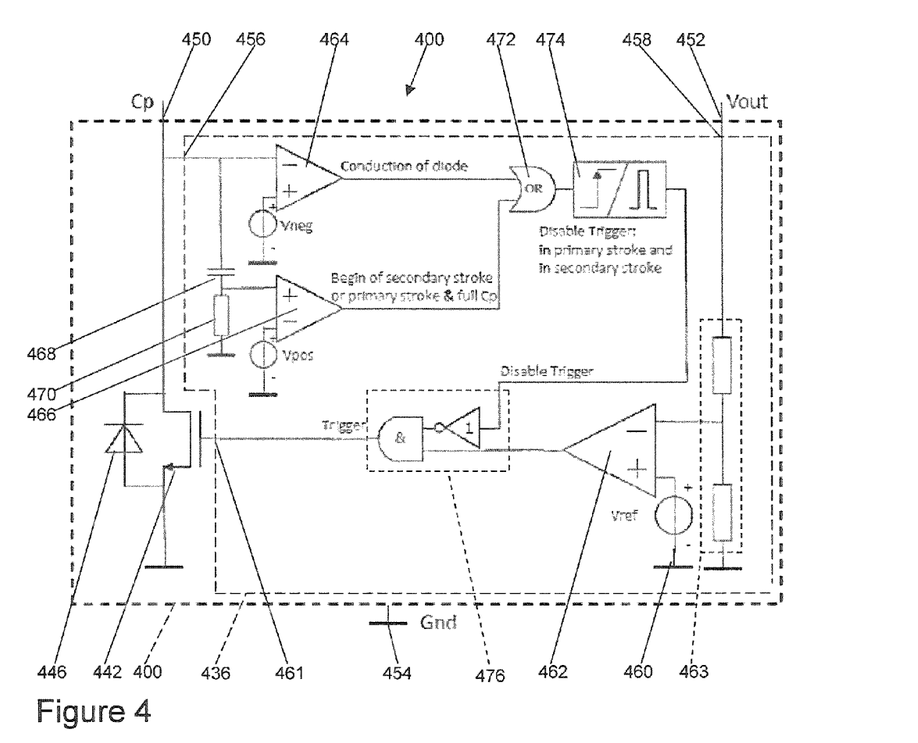

FIG. 4 illustrates a circuit diagram for a secondary controller package 400 suitable for use with the switched mode power supply of FIG. 3a. The secondary controller package 400 comprises a secondary controller circuit 436, a transistor signalling switch 442 and a signalling diode 446, each of which relate to the equivalent components in FIG. 3.

The secondary controller package 400 has a capacitor terminal 450, an output voltage terminal 452 and a second winding terminal (ground) 454.

The secondary controller circuit 436 also has a capacitor terminal 456, an output voltage terminal 458 and a second winding terminal (ground) 460 in addition to a trigger terminal 461.

The secondary controller circuit 436 comprises a voltage comparator 462, and a stroke period checking circuit that contains a first comparator 464 and a second comparator 466.

The voltage comparator 462 compares an output voltage of the power supply converter at the output voltage terminal 452 with a main reference voltage. In this example, the main voltage comparator 462 compares the main reference voltage with the output of a potential divider 463 that has the output voltage of the power supply converter across it. The voltage comparator 462 provides a high output signal when the main reference voltage is greater than the output voltage of the SMPS.

The stroke period checking circuit ensures that a trigger signal is only applied to the transistor signalling switch 442 during a ringing period of the power supply cycle.

The first comparator 464 compares a voltage at the capacitor terminal 456 with a first reference voltage. The first comparator 464 provides a high output signal during the period when the signalling diode 446 is conducting for charging the signalling capacitor.

The second comparator 466 is coupled to the capacitor terminal 456 by a high pass filter capacitor 468. The high pass filter capacitor 468 is coupled to ground by a resistor 470. The second comparator 466 compares the voltage drop across the resistor 470 with a second reference voltage source. The second comparator 466 provides a high output signal at the beginning of the secondary stroke or primary stroke if the signalling capacitor is full.

The output of the first comparator 464 and the second comparator 466 are provided to an OR gate 472. The output of the Or gate 472 is provided as an input to a mono-stable circuit 474. The mono-stable circuit 474 provides a high output pulse during the primary and secondary strokes, which is used to disable the trigger. Typical values for a trigger disabling time are:

7 us for continuous operation of the transmitter by 2-bit communication with hysteretic control, trigger can occur in each ringing period for a switching frequency up to 70 kHz with a secondary stroke up to ½ of 1/70 kHz or 7 us;

100 μs for interrupt operation in no-load for 2-bit communication for voltage drop and voltage lift for a switching period of 1/20 kHz and time for damping;

100 μs for interrupt operation in no-load for 1-bit communication for voltage drop for a switching period of 1/20 kHz and time for damping.

The output of the mono-stable circuit 474 is provided to a logic arrangement 476 that provides a trigger to the trigger terminal 462 when the voltage comparator 462 indicates that the output voltage is insufficient and the stroke period checking circuit indicates that the power cycle is not in the primary or secondary stroke.

FIGS. 5 to 8 illustrate measured waveforms in the circuit of FIG. 3a for two different input potentials and two different signalling capacitances. In each of the FIGS. 5 to 8, three profiles are shown:
 a Vcp voltage signal taken across the signalling capacitor (node 450 Cp with respect to node 454 GND in FIG. 4),
 a Vsec voltage signal taken across the secondary winding, and
 a Vfb voltage signal taken at the feedback terminal of the primary controller.

In each of the FIGS. 5 to 8, the vertical axis is indexed at 10 V intervals and the horizontal axis is indexed at 5 microsecond interval. In each of the FIGS. 5 to 8, a secondary stroke of the power supply cycle is followed by a ringing time, as previously described with reference to FIG. 2.

Figure 5:
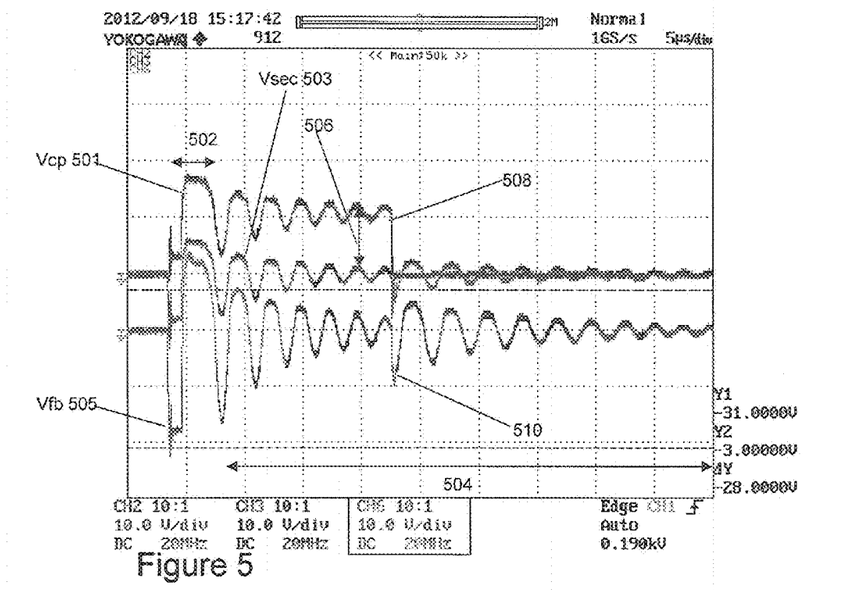
FIG. 5 illustrates signal profiles in the power supply of FIG. 3a operating at an input voltage of 90 V Ac and using a signalling capacitor with a value of 10 nF.

In FIG. 5, the input voltage of the power supply converter is 90 V AC and the signalling capacitor has a value of 10 nF. During the secondary stroke 502, each of the Vcp 501, Vsec 503 and Vfb 505 are at approximately constant respective potentials. During the ringing time 504, parasitic inductance and capacitance causes ringing oscillations to be observed in Vcp 501, Vsec 503 and Vfb 505. The oscillations are dampened and so the signals 501, 503, 505 are attenuated as time elapses. The difference in amplitude of Vcp 501 and Vsec 503 is proportional to the charge stored in the signalling capacitor for communication.

At a trigger instant 508 a secondary controller triggers the signalling switch to close, which discharges the signalling capacitor into the secondary winding of the transformer. At the trigger instant 508, the capacitor is discharged and so Vcp 501 falls to a static low level that indicates that there is no charge stored in potential across the signalling capacitor. Vsec 503 and Vfb 505 also fall asymptotically at the trigger instant 508. However, after the trigger instant 508 the amplitude of the oscillations of Vsec 503 and Vfb 505 increase because the signalling capacitor has been connected in parallel with the transformer.

A primary controller can determine if a transformer signal has been provided by monitoring the feedback voltage. Shortly after the trigger instant 508, the received dVfb/dt is a much greater negative value than would be expected from the preceding Vfb 505 dampened oscillatory signal. Alternatively, the primary controller could determine if a transformer signal had been provided by monitoring the amplitude of Vfb 505; the first part of the Vfb 505 after the transmitted trigger drops significantly below the ground level and oscillatory cycles immediately after the trigger instant 508 have a higher amplitude than those before the trigger instant 508. The change in the amplitude of Vfb 505 cannot occur unless extra energy is added to the transformer. As a further alternative, the primary controller could determine if a transformer signal had been provided by monitoring the frequency of Vfb 505, as will be described in further detail with regard to FIG. 7.

Figure 6:
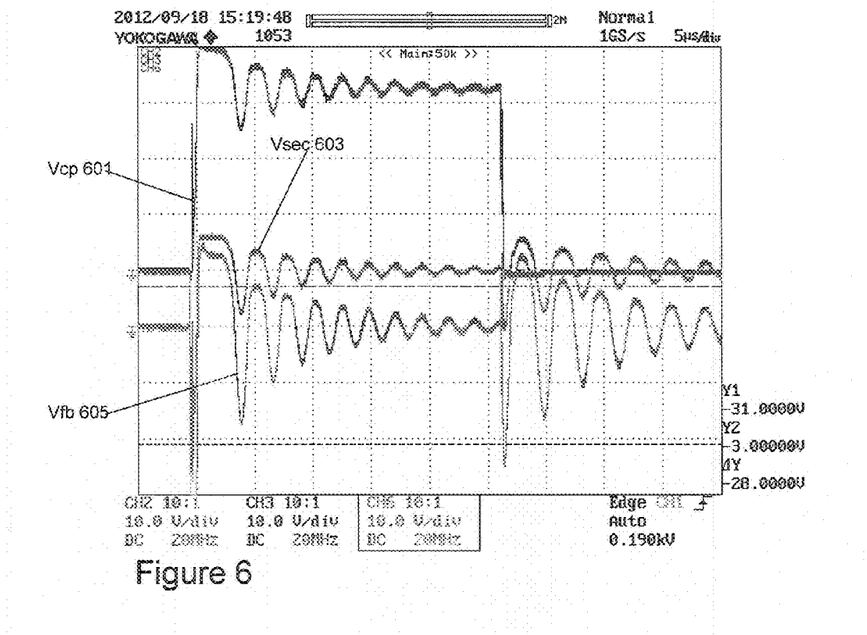
FIG. 6 illustrates signal profiles in the power supply of FIG. 3a operating at an input voltage of 265 V Ac and using a signalling capacitor with a value of 10 nF.

In FIG. 6, the input voltage of the power supply converter is 265 V AC and the signalling capacitor has a value of 10 nF. FIG. 6 has similar features to FIG. 5, although the amplitude of the signals Vcp 601, Vsec 603 and Vfb 605 is greater than in FIG. 5.

Figure 7:
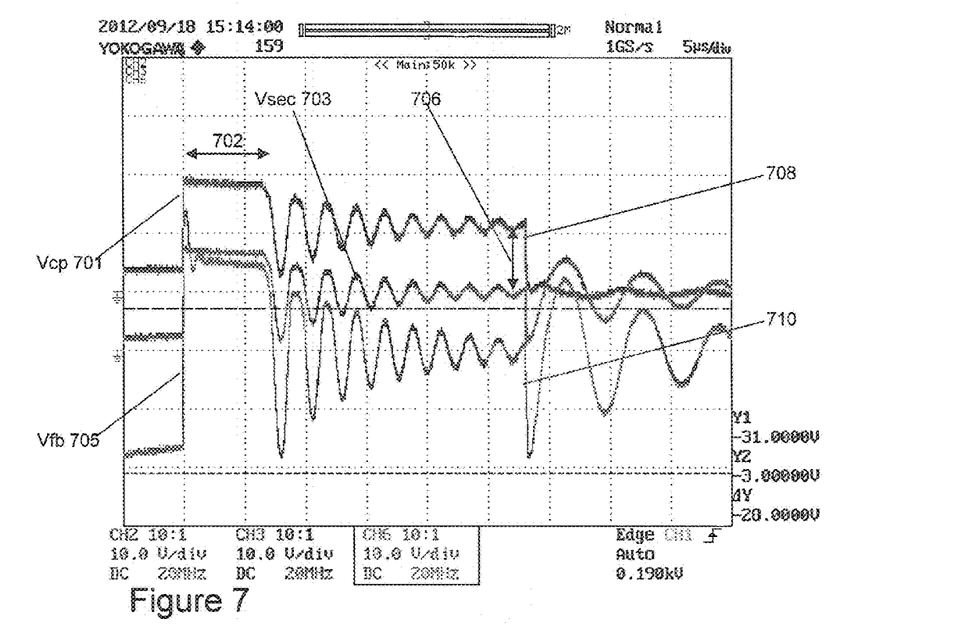
FIG. 7 illustrates signal profiles in the power supply of FIG. 3a operating at an input voltage of 90 V Ac and using a signalling capacitor with a value of 100 nF.

In FIG. 7, the input voltage of the power supply converter is 90 V AC and the signalling capacitor has a value of 100 nF. FIG. 7 has similar features to FIG. 5, although the secondary stroke period 702 is longer than in FIG. 5. In FIG. 7 it can be seen more clearly that the frequency of the ringing oscillations of Vsec 703 and Vfb 705 is lower after the signalling capacitor has been discharged into the transformer. In this example, the capacitance of the signalling capacitor is ten times that shown for FIG. 5. A primary controller can monitor the frequency/period of each ringing oscillation to determine if a change in magnitude of the frequency has occurred, such a change in magnitude being indicative of a transformer signal. An advantage of detecting a lower ringing frequency to determine if a transformer signal is present is that the change can be detected during the entire on-time of the mos switch (signalling switch) in the secondary circuit; while a rapid change of voltage across a winding of the transformer can only be detected at the moment of the change. Increasing the value of the signalling capacitor can make it easier to detect the transformer signal by looking for a change in amplitude of the voltage in the primary side winding or by looking for a change in ringing frequency. Detection of the transformer signal by looking for an edge in the voltage profile, that is, a rapid change in voltage remains always possible.

An alternative is to part-discharge the signalling capacitor by providing a pulsed signalling switch control signal in order to provide a plurality of transformer communication signals. A pulsed gate signal can have one or more of: a defined number of pulses, a defined on-time and a defined frequency, or can be with a defined peak discharge current and with a defined frequency. The repetition of communication signals can make the communication more robust: if a certain trigger is missed for some unknown reason then a subsequent trigger can be detected. The series of pulses can also allow the communication of multi-symbol signals, including multi-bit signals.

Figure 8:
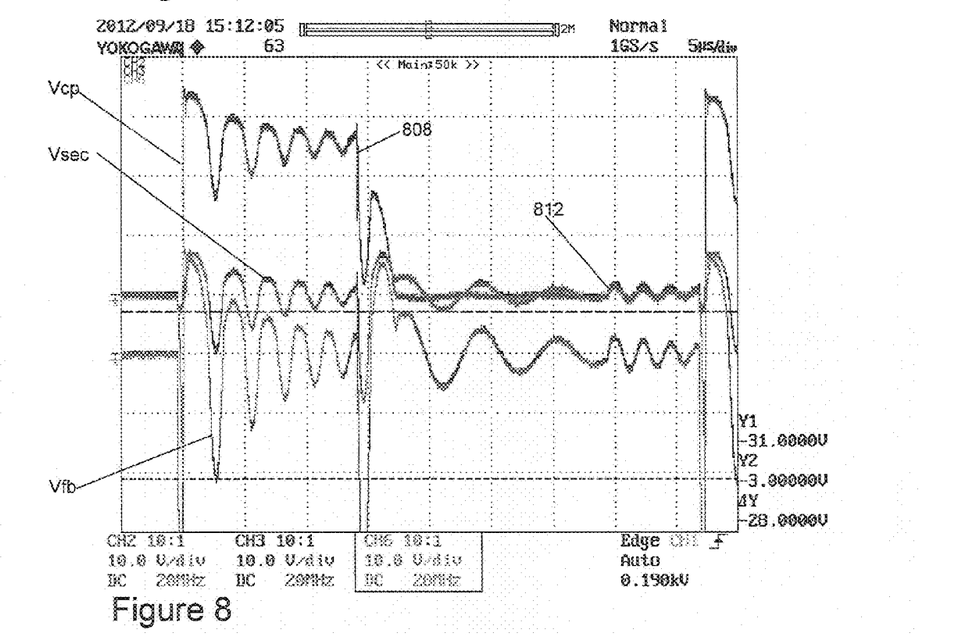
FIG. 8 illustrates signal profiles in the power supply of FIG. 3a operating at an input voltage of 265 V Ac and using a signalling capacitor with a value of 100 nF.

In FIG. 8, the input voltage of the power supply converter is 265 V AC and the signalling capacitor has a value of 100 nF. FIG. 8 has similar features to FIG. 7. However, in FIG. 8 the secondary controller has also opened the switch during the ringing period at a removal instant 812. After the removal instant, the frequency of the ringing returns to that which was observed before the trigger instant 808. At higher input voltage the energy content in the capacitor increases and the appearance of the transformer signal is similar to the start of a primary stroke with energy transfer from the communication capacitor via the transformer to the clamp capacitor and the output capacitor.

It will be appreciated that terms such as "steep", "rapid", "large", "small", etc. used herein can be considered as greater than a threshold value, less than a threshold value, or between two threshold values depending upon the context.

It will be appreciated that any components that are described herein as being "coupled" or "connected" could be directly or indirectly coupled or connected. That is, one or more components could be located between two components that are said to be coupled or connected whilst still enabling the required functionality to be achieved.

The invention claimed is:

1. A switched-mode power supply comprising:
   a transformer with a primary winding and a secondary winding, the secondary winding having a first terminal and a second terminal;
   a rectifier with an input and an output, the input coupled to the first terminal of the secondary winding;
   an output capacitor with a first plate and a second plate, the first plate coupled to the output of the rectifier and the second plate coupled to the second terminal of the secondary winding;
   a power switch coupled in series with the primary winding, configured to be coupled between an output of a rectifier and ground;
   a signalling unit provided in parallel with the secondary winding, the signalling unit comprising a signalling capacitor and a signalling switch coupled in series with each other;
   a secondary controller configured to:
      detect a secondary side variable at the secondary winding, and
      control the signalling switch in accordance with the secondary variable, wherein closing the signalling switch is configured to generate a transformer signal by connecting the signalling capacitor to the secondary winding;
   a primary controller configured to:
      receive the transformer signal from the primary winding or a primary side auxiliary winding of the transformer, and
      control the power switch in accordance with the transformer signal.

2. The switched-mode power supply of claim 1, wherein closing the signalling switch is configured to generate the transformer signal by discharging the signalling capacitor into the secondary winding.

3. The switched-mode power supply of claim 1, wherein the secondary side variable is indicative of one of: a voltage, a power, or a current at the secondary side of the transformer.

4. The switched-mode power supply of claim 1, wherein the primary controller is configured to set the switching frequency of the power switch and the peak value of the primary stroke current or the on-time of the power switch in accordance with the transformer signal.

5. The switched-mode power supply of claim 1, wherein the secondary controller is configured to connect the signalling capacitor to the secondary winding in a single pulse during a ringing stroke between a secondary stroke of a first cycle and a primary stroke of a next cycle of the switched-mode power supply.

6. The switched-mode power supply of claim 5, wherein the transformer signal comprises at least one of: a rate of change of voltage across a winding of the transformer that is greater than or less than a threshold value, a change of voltage below or above a threshold of a winding of the transformer and a change in ringing frequency.

7. The switched-mode power supply of claim 1, wherein the secondary controller is configured to connect the signalling capacitor to the secondary winding in a plurality of pulses during a ringing stroke between a secondary stroke of a first cycle and a primary stroke of a next cycle of the switched-mode power supply.

8. The switched-mode power supply of claim 1, further comprising a diode coupled across terminals of the signalling switch.

9. The switched-mode power supply of claim 1, wherein the signalling capacitor is configured to be charged during a secondary stroke of the switched-mode power supply cycle.

10. The switched-mode power supply of claim 9, wherein the signalling switch is a first signalling switch and the signalling capacitor is a first signalling capacitor, further comprising a second signalling unit having a second signalling capacitor and a second signalling switch, wherein a terminal of the second signalling capacitor is coupled directly to the input of the rectifier, a terminal of the first signalling switch is coupled directly to the input of the rectifier, and wherein the secondary controller is further configured to control the second signalling switch in accordance with the secondary variable.

11. The switched-mode power supply of claim 10, wherein a first polarity transformer signal resulting from a connection of the first signalling capacitor to the secondary side winding is of an opposite polarity to a second polarity transformer signal resulting from a connection of the second signalling capacitor to the secondary side winding, and wherein the primary controller configured to increase the power delivered to the primary winding if the first polarity transformer signal is received and to decrease the power delivered to the primary winding if the second polarity transformer signal is received.

12. The switched-mode power supply of claim 10, wherein the secondary controller is configured to part-discharge the first signalling capacitor and to part-discharge a second signalling capacitor by providing respective pulsed signalling switch control signals in order to provide a plurality of transformer signals.

13. The switched-mode power supply of claim 9, wherein the primary controller is configured to alter the power level within a cycle of the power supply in a step size, wherein the step size is one of: a constant step size; a steps that scales with the absolute power level for a constant ripple voltage; and a step size determined by an algorithm that enlarges the step size if consecutive power-up or power-down transformer signals are received.

14. The switched-mode power supply of claim 1, wherein the secondary controller is configured to part-discharge the signalling capacitor by providing a pulsed signalling switch control signal in order to provide a plurality of transformer signals.

15. The switched-mode power supply of claim 1, wherein the signalling capacitor has a first plate coupled to the first terminal of the secondary winding, and a second plate coupled to the signalling switch, the switched mode power supply further comprising:
 a charging switch having a first terminal coupled to the first plate of the output capacitor and a second terminal coupled to the second plate of the signalling capacitor;
 wherein the secondary controller is configured to operate the charging switch in accordance with the secondary variable.

* * * * *